United States Patent [19]

Compton

[11] Patent Number: 5,040,700
[45] Date of Patent: Aug. 20, 1991

[54] MELTED CHEESE DISPENSER WARMING METHOD AND APPARATUS

[75] Inventor: Jay W. Compton, Sparks, Nev.

[73] Assignee: Wells Manufacturing, Verdi, Nev.

[21] Appl. No.: 166,446

[22] Filed: Mar. 10, 1988

[51] Int. Cl.[5] .............................................. B67D 5/62
[52] U.S. Cl. ................... 222/146.5; 222/383; 222/563; 219/535
[58] Field of Search ............... 222/146.5, 146.2–146.4, 222/383, 563; 137/341; 219/535, 301; 239/133, 135, 139; 425/549

[56] References Cited

U.S. PATENT DOCUMENTS

| | | | |
|---|---|---|---|
| 1,769,437 | 7/1930 | Kramer, Jr. ...................... | 222/146.5 |
| 2,506,574 | 5/1950 | Boydstun ........................... | 219/535 |
| 3,614,389 | 10/1971 | Mausza ........................ | 222/146.5 X |
| 4,094,446 | 6/1978 | Brutsman ......................... | 222/146.5 |
| 4,544,085 | 10/1985 | Frazer ........................... | 222/146.5 X |
| 4,553,023 | 11/1985 | Jameson et al. ............ | 222/146.5 X |

Primary Examiner—Robert P. Olszewski
Assistant Examiner—Boris Milef
Attorney, Agent, or Firm—Herbert C. Schulze

[57] ABSTRACT

A method and apparatus for performing the method wherein pump spouts for melted cheese utilized on food snack products and the like which includes a fully insulated and heated jacket for a pump spout which will maintain the melted cheese at the desired level of heat and will not over heat nor burn the cheese in the spout at times between servings or activations of the pump.

1 Claim, 2 Drawing Sheets

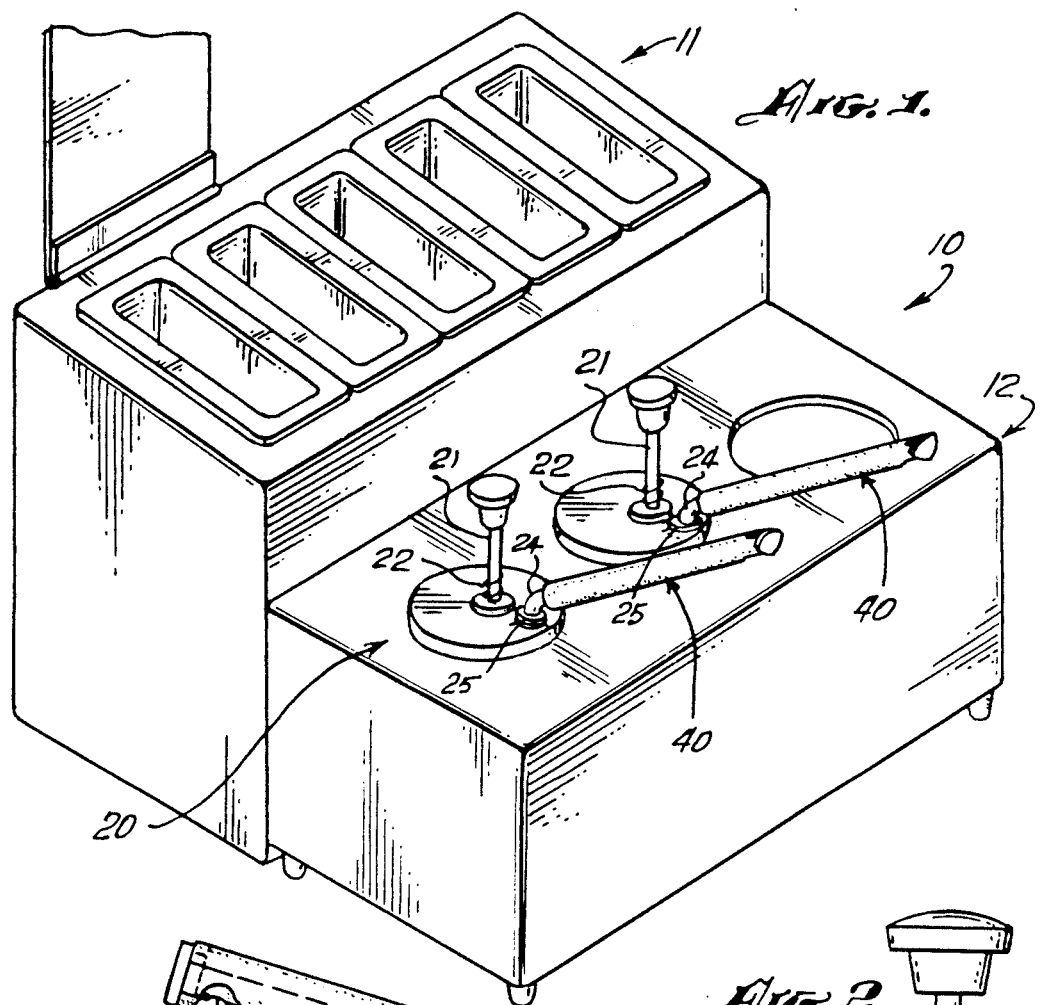
Fig. 1.
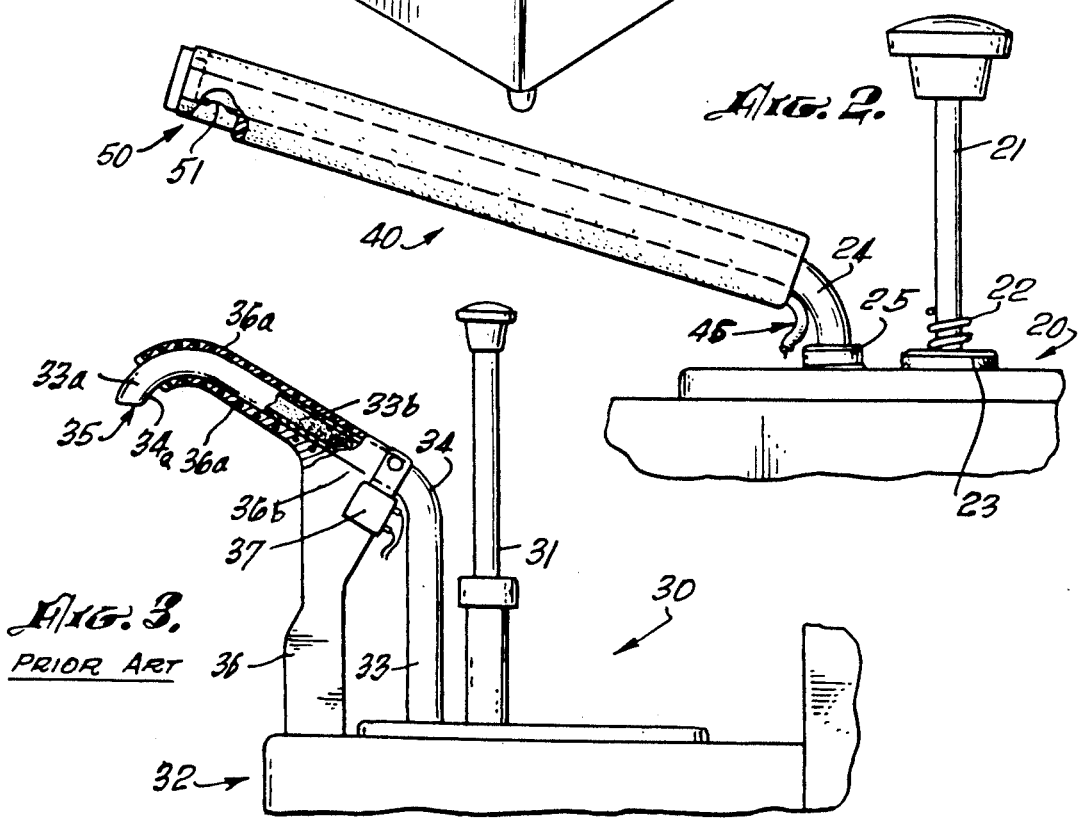
Fig. 2.
Fig. 3.
PRIOR ART

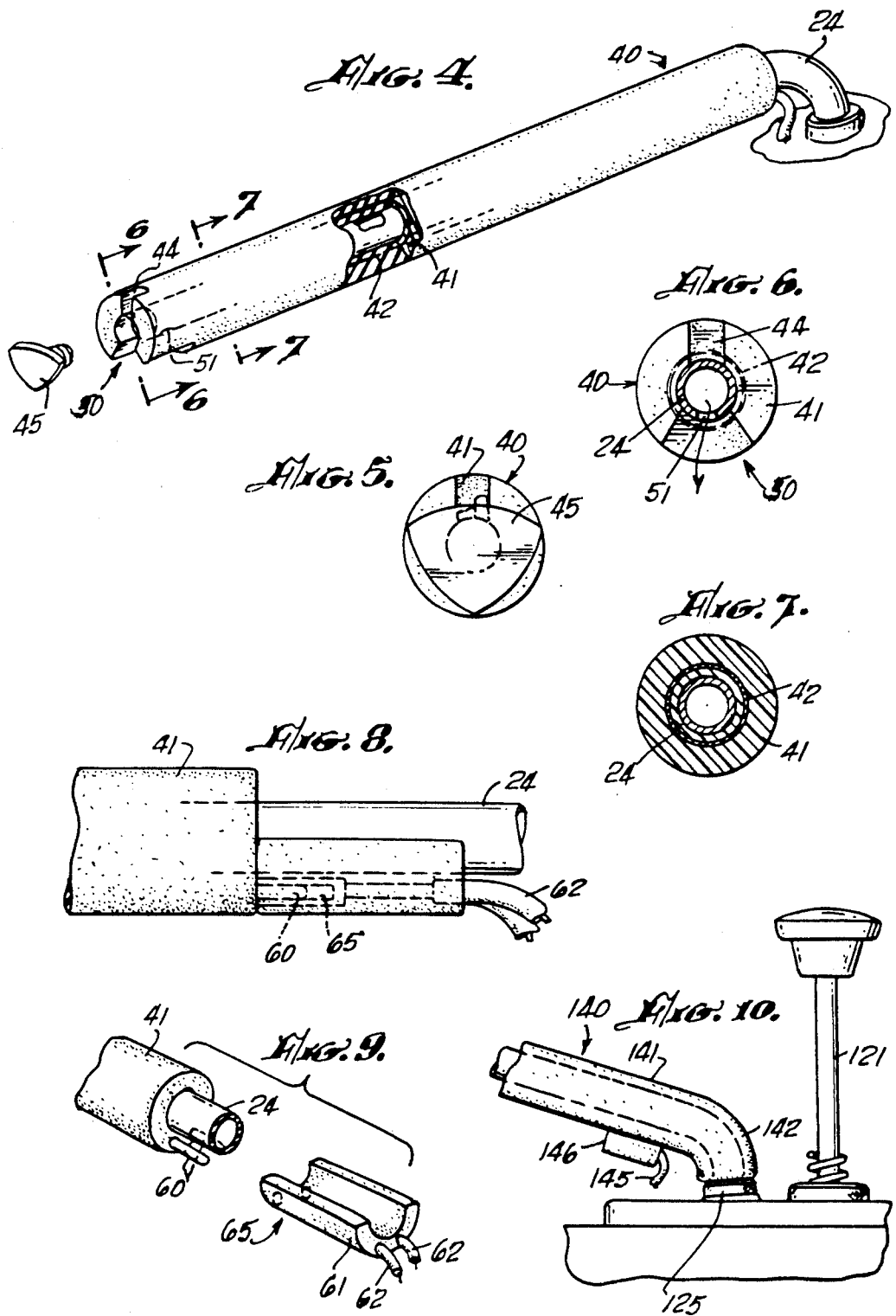

MELTED CHEESE DISPENSER WARMING METHOD AND APPARATUS

CROSS REFERENCE TO RELATED PATENT APPLICATIONS

There are no patent applications filed by me related to the within application.

BACKGROUND OF THE INVENTION

I. Field of the Invention

This invention is in the general field of pumps for melted cheese utilized on food products; the invention is more particularly related to the spout of such pumps; the invention is even more particularly related to a method and apparatus for maintaining the cheese within the spout at its proper temperature during periods when it is not in use; the invention is more particularly related to a properly heated and insulated cover about the spout.

II. Description of the Prior Art

In attempting to maintain a proper temperature within a melted cheese spout through which melted cheese is pumped, the only prior art known to me consists of a heated, massive block of metal, such as aluminum or the like, with a partial shield of the same material around the spout and which is designed to maintain a heated, in contact, arrangement. Such prior art has significant disadvantages as will be outlined in the summary of the invention below.

SUMMARY OF THE INVENTION

Pumps which dispense melted cheese for products such as being placed upon hot dogs, with corn chips or the like, etc. are in wide use. There are many thousands of such pumps in use. Most of these pumps are in convenience stores or fast food stores or other such locations such that there is intermittent use. One portion of cheese will be pumped through the spout to the food concerned and then the spout may be idle for a long period of time. When the pump is idle, the accumulation of cheese within the pump spout itself becomes cooled to a point which is below the health standard requirements as well as below the taste requirements for the product. Thus, frequently, a customer will buy a product utilizing melted cheese and find that part of the cheese is cold and part warm after the warm cheese comes through the spout and expels the colder cheese.

This is a problem which has received a great deal of attention from manufacturers and producers of such equipment. Before my invention, as described in this patent application, it was common practice for manufacturers to attempt to solve this problem by utilizing a large block of heated metal such as aluminum or the like connected at some point to the spout and in some cases with a metal jacket partially enclosing the spout. The block of material so utilized was then commonly heated and an illustration of such prior art is given in connection with the drawings of a preferred embodiment of this invention, which follows.

A common fault of this type of attempt to keep a heated spout is that one portion of the spout in contact with the heated block becomes over heated and results in a plug, or glob of cheese which is slightly burnt and discolored with cold cheese on both sides of it within the spout. This is not only unappetizing, but in some circumstances is unsanitary and not in accordance with proper food regulations.

The result of the prior art then is that one may obtain some cold cheese followed by a dark brown or burnt bit of cheese which may be too hot, ultimately followed by cheese of the correct temperature which comes from the pump beneath the spout. An additional disadvantage is that the hot block of metal is closely associated with the end of the spout and the user of the cheese pump may be burned if he accidentally touches the heated block.

I have solved this problem in a unique manner as will be clear upon full reading of the description of a preferred embodiment. In general terms, however, the manner in which I have solved this problem is to encase the tube spout in an insulating sleeve having a foil or the like heating wrapper within the insulation and approximating the outer surface of the tube over its entire length. In accomplishing this I had to solve a number of problems, one of which was the manner in which the end of the spout was maintained properly heated and yet maintained in such manner that the cheese could be dispensed from the completely heated end. I accomplished this by making a spout which was essentially a straight spout mounted at an angle to the container of melted cheese, with a portion cut out of the end of the insulating sleeve and a hole provided in the spout near its end with a closing plug to seal off the end of the spout and sleeve thereby maintaining uniform heat conditions, but with hot cheese always available for dispensing through the hole in the spout and a properly shaped opening in the heating and insulating sleeve adjacent the end of the spout.

It is an object of this invention to provide a method and apparatus for maintaining a cheese dispensing spout at such temperature that the cheese within the spout remains at the recommended and desirable temperature, even during periods when the spout is not being continuously used;

Another object of this invention is to provide a means for heating a cheese spout wherein there is no danger of a user being burned by a device being used to attempt to maintain a warm spout during periods of non use.

The foregoing and other objects and advantages of this invention will become apparent to those skilled in the art upon reading the description of preferred embodiment which follows, in conjunction with a review of the appended drawings.

BRIEF DESCRIPTION OF THE DRAWINGS

FIG. 1 is a schematic perspective of a melted cheese dispenser pump of customary construction, but wherein the heated and insulated spouts of this invention are in use;

FIG. 2 is an enlarged, broken away, partially sectioned side elevation of a pump handle and spout from FIG. 1;

FIG. 3 is a partially sectioned and broken away side elevation of the prior art;

FIG. 4 is a partially sectioned, partially exploded perspective of a preferred embodiment of an apparatus to practice the method of this invention;

FIG. 5 is a front end elevation of the apparatus as shown in FIGS. 1 and 2;

FIG. 6 is the same view as FIG. 5 but with the end plug removed;

FIG. 7 is a section on 7—7 of FIG. 4;

FIG. 8 is an enlarged, partially broken away, schematic view of the receiving end of the cheese tube;

FIG. 9 is a disconnected, broken away, sectioned view of an alternate connection for the heater; and FIG. 10 is a partially broken away side elevation of an alternate embodiment.

DESCRIPTION OF A PREFERRED EMBODIMENT

It is preferable to first look at FIG. 3 which shows a pump for melted cheese (known in the art) 30. The pump has a handle 31 of customary construction known to those in the art for pumping the cheese out and a spout 33 terminating in the end 35 wherein the cheese is expelled, and the spout as normally used is bent 34 and at 34a in a customary manner known to those in the art.

The cheese will be expelled through the opening 35 of the tube 34 upon depression or other operation of the pump handle 31. This is bringing the melted cheese from the container at 32 up through the various elements as indicated and as known to those skilled in the art.

In this entire art there has always been a problem that the tube 34 contains cheese which becomes cooled relative to that in the container 32 because the unit is used intermittently.

Attempts have been made in the past, and this is the only known prior art, to cure this by a heat sink portion 36 with sleeves 36a around the end of the spout. This is controlled by heat element 37 and results in a high heat at the area immediately adjacent the connection of the heat sink 36 and the spout 34.

At 33a, there will be cold cheese or other such product; the same thing will exist at 33.

Meantime, the heated cheese in 32 will remain constant and properly heated.

However, at the area 36a and more particularly directly adjacent the area 36b, controlled by control unit 37, there will become a burnt or overheated section of the cheese 33b. The jacket at 36a is of little value in this connection.

My invention compared to the prior art, is explained completed by reference to the balance of the figures.

At FIG. 1 there is shown generally a number of condiment dispensing compartments 11 and the heated compartment 12 having the cheese pump unit 20 with a remaining opening which can receive a similar pump or can be used for ladling or other purposes.

In FIG. 1 the spouts 40 for the cheese dispensing units have been installed in accordance with the present invention.

Turning to the remainder of the figures, it is seen that the cheese pump has a customary (known to those in the art) pump handle 21 sometimes using a return spring 22 connected at 23 to the reservoir for the melted cheese container in the reservoir area 12.

The melted cheese when pumped will come through the conduit 24 connected to the pumping and reservoir unit at 25 by means known to those skilled in the art.

At this point, the unusual nature of this device as indicated generally 40 consisting of an insulated sleeve 41 over the metallic spout unit 24. The unit 40 has a heated element 42 heated by and from electrical power 45 as will be explained later. The cheese will be expelled through opening 51 and 50 generally in the insulated dispensing element.

FIG. 4 shows the plug necessary to plug the conduit 24 by plug unit 45 which plugs the conduit 24 completely.

The heater element 42 as shown in FIG. 4 is within the insulated sleeve 41. The cross section figures will indicate in more detail in FIG. 6 the composition of this situation.

At FIG. 6 there is shown the general heating element 42 which is insulated from the conduit 24 by a small portion of the overall insulated sleeve 41. The opening 50 in the insulated sleeve coinincides with and clears the opening 51 in the tube 24. This as shown in the other figures is closed by the unique plug 45 so that the cheese or other food being expelled will be not contaminated by contact with any of the other elements.

FIG. 7 shows in more detail the general insulating area 41, the tube 24, the heating element 42.

At FIGS. 8 and 9 electrical connections are shown which will be understood by those skilled in the art wherein the electrically heated and insulated sleeve 41 with the heated element therein, is shown to be connected at 60 and 65 through the apparatus 61 to power elements 62 in a manner known to those skilled in the art.

While the heated sleeve 40 may be molded with the heater 42 in place and impregnated by the material 41, it may also be formed by placing the insulating conductive material between heater sleeve 40 and tube 24 first, then wrapping the heater around such material and then covering or molding the bulk of the material 41 forming the total sleeve 40 about the item.

At FIG. 10 there is shown an alternate embodiment wherein the encasing covering 140 is molded around the bend at 142 and to the heated tube at 125 with the power being supplied at 45 to a conductor and connecting element 146 which may include a thermostat or heat control element, which will be known to those skilled in the art.

Having thus described the invention, the advances which have been made will be clear to those skilled in the art. It is further clear to those skilled in the art that the invention herein described in detail is not for any purpose of limitation, but is merely for purposes of illustration.

I claim:

1. The method for maintaining heat in a food dispensing spout such that food which may be normally heated and dispensed through said spout will be maintained at a constant temperature equivalent to the temperature of the supply of such food comprising: 1 providing a heated reservoir containing heated food; 2 connecting a pump mechanism to said reservoir in such manner that the pump is in contact with the heated food and upon activation of the pump a quantity of the food is pumped through said pump from said reservoir; 3 connecting a dispensing spout to said pump at a point distant from the heated food in the heated reservoir; 4 encasing said spout with a thin covering of heat transferring rubber over substantially the entire length and circumference of said spout; 5 encompassing said thin rubber covering with an electrically activated heating blanket covering the entire circumference and length of said thin rubber covering; 6 encasing the spout, thin rubber covering, and heating blanket in a thick insulating cover; 7 activating said electrically activated heating blanket to such temperature that the temperature of the food within the spout is the equivalent of the temperature of the food within the heated reservoir; and 8 activating said pump until heated food is expelled through said spout.

* * * * *